United States Patent
Wentorf, Jr. et al.

[11] 3,767,371
[45] *Oct. 23, 1973

[54] CUBIC BORON NITRIDE/SINTERED CARBIDE ABRASIVE BODIES

[75] Inventors: Robert H. Wentorf, Jr., Schenectady; William A. Rocco, Scotia, both of N.Y.

[73] Assignee: General Electric Company, Schenectady, N.Y.

[ * ] Notice: The portion of the term of this patent subsequent to July 3, 1990, has been disclaimed.

[22] Filed: July 1, 1971

[21] Appl. No.: 158,709

[52] U.S. Cl.......................... 51/307, 51/309, 264/65
[51] Int. Cl........................................... B24d 7/14
[58] Field of Search.................... 51/293, 307, 308, 51/309; 23/191, 358; 264/65

[56] References Cited
UNITED STATES PATENTS

| | | | |
|---|---|---|---|
| 3,233,988 | 2/1966 | Wentorf et al. | 51/309 |
| 2,888,355 | 5/1959 | Taylor | 51/307 |
| 3,136,615 | 6/1964 | Bovenkerk et al. | 51/309 |
| 3,192,015 | 6/1965 | Wentorf | 51/307 |
| 3,212,851 | 10/1965 | Bundy et al. | 51/307 |
| 2,947,617 | 8/1960 | Wentorf | 51/307 |

*Primary Examiner*—Donald J. Arnold
*Attorney*—John F. Ahern et al.

[57] ABSTRACT

Abrasive bodies comprising combinations of cubic boron nitride crystals and sintered carbide are disclosed. These composite bodies are prepared by superpressure processes. Cubic boron nitride contents of up to about 99 volume percent have been successfully employed in certain constructions. Similar abrasive bodies have been prepared from mixtures of cubic boron nitride, diamond and carbide powder.

15 Claims, 7 Drawing Figures

PATENTED OCT 23 1973
3,767,371
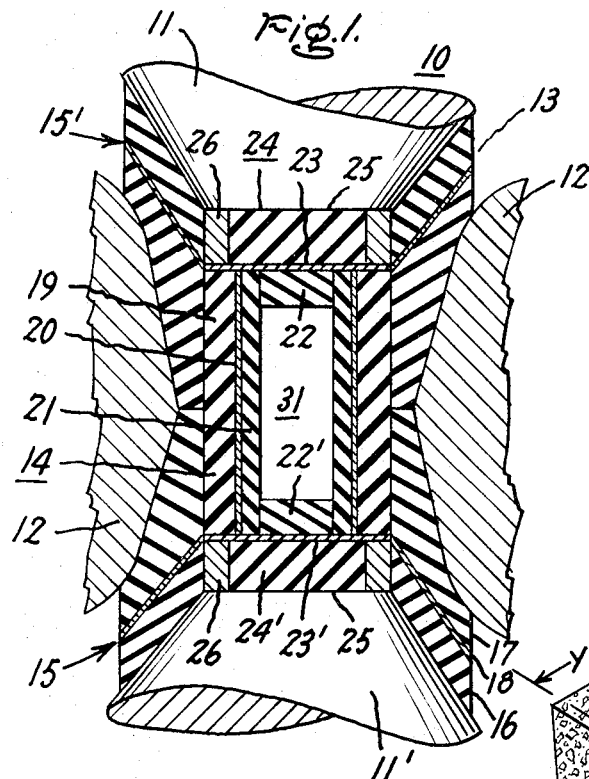
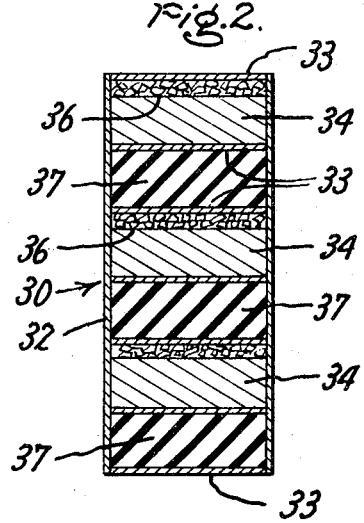
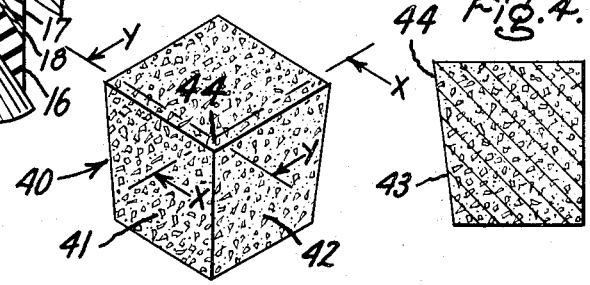
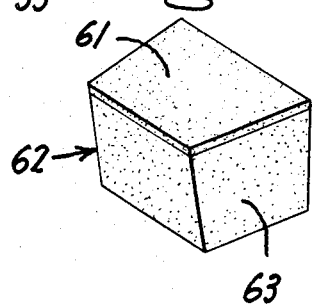
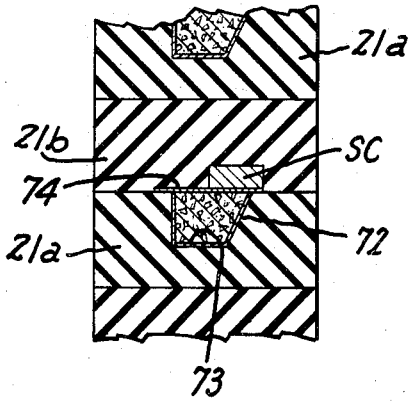
Inventors:
Robert H. Wentorf Jr
William A. Rocco,
by *[signature]*
Their Attorney.

CUBIC BORON NITRIDE/SINTERED CARBIDE ABRASIVE BODIES

BACKGROUND OF THE INVENTION

The preparation of cubic boron nitride (CBN) is disclosed and claimed in U. S. Pat. No. 2,947,617 — Wentorf. The bonding together of CBN crystals to form a compact abrasive body is disclosed in each of U. S. Pat. No. 3,136,615 — Bovenkerk et al. and U. S. Pat. No. 3,233,988 — Wentorf et al. Each of the aforementioned patents is incorporated by reference.

The production of ever more dense, tougher compacts of CBN is constantly being sought in order to improve the capabilities for machining nickel-base superalloys at higher speeds, e.g., at greater than 50 surface feet/minute.

SUMMARY OF THE INVENTION

Superpressure processes have been employed to prepare abrasive compacts comprising combinations of CBN crystals and sintered carbide. Good compacts have been produced employing CBN crystals greater than about 80 micrometers in largest dimension.

Combinations of CBN crystals, carbide powder and diamond crystals have also been successfully employed to prepare useful compacts. Composite bodies in which a layer of CBN crystals has been bonded to the surface of a sintered carbide disc have been prepared in which the CBN layer has been found to be essentially free of voids.

BRIEF DESCRIPTION OF THE DRAWING

This invention will be better understood from the following description and drawing in which:

FIG. 1 illustrates on exemplary high pressure, high temperature apparatus useful in the preparation of the product of this invention;

FIG. 2 illustrates in section one form of a charge assembly configuration for use within the apparatus of FIG. 1 in the practice of the instant invention;

FIG. 3 is a three-dimensional view illustrating a composite CBN machine tool insert;

FIG. 4 is a section taken through the insert of FIG. 3 either on line XX or on line YY;

FIGS. 5 and 6 are each three-dimensional views of composite CBN/sintered carbide machine tool inserts prepared according to this invention and FIG. 7 is a sectional view showing a combined liner/charge assembly for preparing the structures of FIGS. 3, 5 and 6.

DESCRIPTION OF THE PREFERRED EMBODIMENT

One preferred form of a high pressure, high temperature apparatus in which the composite tool insert of the instant invention may be prepared is the subject of U. S. Pat. No. 2,941,248 — Hall (incorporated by reference) and is briefly illustrated in FIG. 1. Reaction vessel arrangements useful in the practice of this invention are described in U. S. Pat. application S.N. 144 — Wentorf, Jr. (now U. S. Pat. No. 3,609,818), filed Jan. 2, 1970 (incorporated by reference).

Apparatus 10 includes a pair of cemented tungsten carbide punches 11 and 11' and an intermediate belt or die member 12 of the same material. Die member 12 includes an aperture 13 in which there is positioned a reaction vessel 14. Between punch 11 and die 12 and between punch 11' and die 12 there are included gasket/insulating assemblies 15, 15', each comprising a pair of thermally insulating and electrically non-conducting pyrophyllite members 16 and 17 and an intermediate metallic gasket 18.

Reaction vessel 14 in one preferred form, includes a hollow salt cylinder 19. Cylinder 19 may be of other material, such as talc, which a). is not converted during high pressure-high temperature operation to a stronger, stiffer state (as by phase transformation and or compaction) and b). is substantially free of volume discontinuities occurring under the application of high temperatures and pressures, as occurs, for example, with pyrophyllite and porous alumina. Materials meeting the criteria set forth in U. S. 3,030,662 - Strong (column 1, lines 59 through column 2, line 2, incorporated by reference) are useful for preparing cylinder 19.

Positioned concentrically within and adjacent cylinder 19 is a graphite electrical resistance heater tube 20. Within graphite heater tube 20 there is in turn concentrically positioned the cylindrical salt liner 21. The ends of liner 21 are fitted with salt plugs 22, 22', disposed at the top and bottom, respectively. As will be described hereinbelow liner 21 may have a cylindrical hollow core to receive one large charge assembly containing sub-assemblies or the liner may consist of a series of mold assemblies arranged in a stack for the preparation of a plurality of composite tool inserts, e.g., as shown in FIGS. 3, 5, and 6.

Electrically conductive metal end discs 23 and 23' are utilized at each end of cylinder 19 to provide electrical connection to graphite heater tube 20. Adjacent each disc 23, 23' is an end cap assembly 24 and 24' each of which comprises a pyrophyllite plug or disc 25 surrounded by an electrically conducting ring 26.

Operational techniques for simultaneously applying both high pressures and high temperatures in this apparatus are well known to those skilled in the superpressure art. The foregoing description relates to merely one high pressure, high temperature apparatus. Various other apparatuses are capable of providing the required pressures and temperatures that may be employed within the scope of this invention.

FIG. 2 illustrates an arrangement for producing a plurality of disc-or pill-shaped conposites (sintered carbide substrate with a layer of sintered CBN formed thereover). Charge assembly 30, although not illustrated to the same scale, fits within space 31 of the apparatus of FIG. 1.

Charge assembly 30 consists of cylindrical sleeve 32 of shield metal selected from the group consisting of zirconium, titanium, tantalum, tungsten and molybdenum. Within cylindrical shield metal sleeve 32 are disposed a number of sub-assemblies protected above and below by shielding discs 33 made of a metal selected from the group enumerated for the prepartion of sleeve 32 except as stated hereinbelow. Each sub-assembly so protected on all sides consists of larger mass 34 and smaller mass 36. Each mass 36 is largely or completely made up of CBN powder (greater than about 80 micrometers in largest dimension).

By employing a pre-sintered carbide disc for mass 34 and clean CBN crystals larger than about 120 mesh (U. S. Sieve) size for mass 36, without further additives, a single abrasive body may be produced as described below in which the CBN portion is essentially free of voids and is affixed to the carbide disc by excellent bonding.

EXAMPLE I

Essentially pure CBN grit, 100 mesh size, was distributed in a mass over one face of a hard sintered carbide disc made from grade 883 Carboloy carbide powder. The combination was enclosed in a thin zirconium shield to exclude and remove oxygen. This assembly was surrounded in turn by NaCl elements (to fill volume 31) in a high pressure apparatus. After about an hour under the application of high pressure and high temperature (55–60 kb and 1,500°C) a composite abrasive body was recovered. The cubic boron nitride portion was found to be essentially free of voids and an excellent bond was found to exist between the sintered carbide and adjacent CBN.

The composite of Example I was examined and it was found that the substantial elimination of voids in the CBN mass (99 volume percent CBN) had been achieved by several mechanisms:

a. the intrusion of zirconium metal (from the sheath) to a small depth, e.g., 0.2 mm;
b. crushing of the CBN grains (which then can consolidate);
c. the intrusion of carbide material between CBN grains during the high temperature treatment (when the carbide material was in the plastic state) and
d. direct bonding between CBN grains.

The CBN grains had large areas of contact with each other and appeared to have been partly plastically deformed to accommodate each other.

In order to retain the benefits of mechanically unstable structuring of the charge assembly, discs 37 are made of the same material as cylinder 19, e.g., NaCl, hexagonal BN to provide necessary "follow through" action to occupy reduced volume within each sub-assembly during the process.

Sinterable carbide powder as described hereinbelow may be used in place of the pre-sintered carbide as mass 34. In such a case sintering of the carbide powder occurs in situ.

The direct bonding relationship created between the very high strength CBN material and the significantly larger mass of underlying stiff carbide support material obviates any need for the interposition of any bonding layer therebetween, as for example results from brazing or soldering. By providing stiff, non-yielding support material in direct contact with the CBN-rich machining edge region, the incidence of fractures in the CBN material during use of the tool insert in machining is minimized.

Composites prepared in accordance with this invention have at times been accidentally broken during decompression of the reaction vessel to recover the product. This type of breakage occurs in a direction generally perpendicular to the vertical axis of the charge assembly. In the case of the composites produced with the sub-assemblies of FIG. 2 the interface between the CBN and the sintered carbide lies in this same direction. The high quality of the bond at this interface is shown by the fact that most usually the breakage occurred through the CBN layer. Only rarely did breakage occur at the interface and in these instances the breakage surface was irregular, passing through the CBN and through the sintered carbide as well as along the interface. Thus, the interface is in general stronger than the tensile strength of the CBN crystals.

Microscopic (300X) examination of the polished edges of composites shaped into tool inserts has shown the reasons for this unusually strong interface bond. In "good bonding" the CBN grains at the interface appear (at 300X magnification) either to be in direct contact with the sintered carbide or to have a thin reaction layer disposed between the CBN grains and the sintered carbide. Any reaction layer is less than 10 micrometers thick indicating that in any case minimal disruption of, and attack on, the sintered carbide structure occurs. The interface is free of voids and is irregular on the scale of micrometers (1–100$\mu$) due to pushing of the CBN into the sintered carbide and/or because of the movement of plastically deformed sintered carbide into interstices between adjacent CBN crystals. This type and quality of interlocked interface is clearly unattainable by soldering of a pre-formed CBN compact to a sintered carbide disc.

The preparation of CBN compacts for use as the abrading elements in cutting and grinding tools is disclosed in the aforementioned Wentorf, Jr. et al. and Bovenkerk et al. patents. After preparation, the compact prepared therein is attached to some support. There is no teaching in these patents leading the technician to the preparation of a composite tool insert in which a CBN compact when formed is simultaneously integrated with a sintered carbide support mass as in the instant invention in any way and, in particular, without the use of additive materials.

In addition to the type of composite body described hereinabove in which a mass of CBN crystals are supported on and bonded to a pre-formed sintered carbide mass, two other types of composites may be prepared. Both of the latter composites embody a relatively uniform distribution of sintered carbide in a mass of abrasive grains. In the second type of composite the abrasive grains are CBN grains while in the third type of composite the abrasive grains are a mixture of CBN grains and diamond grains.

EXAMPLE II

A mixture of 94 percent by volume CBN grit and 6 percent by volume Carboloy grade 883 carbide powder (6 percent Co, 94 percent WC) was enclosed in a thin Zr shield (to exclude and remove oxygen). This assembly was introduced into a high pressure, high temperature apparatus as described in Example I. The mixture was subjected to about 55 kb and 1500°C for about 60 minutes. Microscopic examination of polished surfaces of the resulting composite shows that the sintered carbide had moved into the most minute crevices between CBN grains. Although direct bonding between CBN grains was not extensive in this type of composite, the bond between CBN and metal (carbide) was excellent. A fractured surface of the composite displayed very few sites at which a CBN grain had been pulled out of the system. Instead, the CBN grain had fractured. No reaction layer was observed next to the CBN grains at 300X magnification.

For the preparation of this type of composite, preferably, CBN crystal contents of from about 70 volume percent to about 94 volume percent are used. With this large CBN content, direct contact occurs between CBN crystals under the high pressures employed. As a result, crushing of grains occurs and a large fraction of the initial void space becomes filled by fragmented CBN grains. Intruding carbide powder apparently hinders direct bonding between CBN grains, but CBN/carbide bonding provides a tough, strong, abrasive body.

CBN grain contents of less than 70 volume percent may, of course, be used. Sintering times may vary from about 10 to about 60 minutes. Pressures ranging from about 45 to 60 kb may be used. Temperatures employed may vary from 1,300° to 1,600°C. Combinations of pressure and temperature should be selected which will insure thermodynamic stability of the CBN.

This second type of composite may, in turn, be bonded to a sintered carbide support block by conventional means, e.g., solders. As an alternate, this composite/support block structure may be prepared in situ a). by disposing the CBN grit/carbide powder mixture over the surface of a sintered carbide disc or b). by using in combination a layer of sinterable carbide powder and contiguous therewith, a layer of CBN grit/carbide powder mixture. In these alternate arrangements, as in the arrangements previously described, the reaction mass is preferably contained in a zirconium sheath.

The carbide powder, where employed, is preferably a tungsten carbide molding powder (mixture of carbide powder and cobalt powder) commercially available in particle sizes of from 1 to 5 microns. The tungsten carbide may, if desired, be replaced in whole or in part by either or both of titanium carbide and tantalum carbide. Since some use of nickel and iron has been made in the bonding of carbides, the material for providing the metal bond in the cemented carbide may be selected from the group consisting of cobalt, nickel, iron and mixture thereof. Cobalt, however, is preferred as the metal bond material. The composition of carbide molding powders useful in the practice of this invention may consist of mixtures containing about 75–97 percent carbide and about 3–25 percent metal bond material. Examples of carbide powders used are Carboloy grade 883 carbide (6 percent Co, 94 percent WC) and Carboloy grade 905 (3 percent Co, 93 percent WC, 3.85 percent TaC, 0.15 percent TiC).

For the preparation of the third type of composite (CBN grains, diamond grains and sintered carbide) the description set forth hereinabove for the preparation of the second type of compact is applicable except for the abrasive grain content. Because of the diamond content, disc 33 should be either zirconium or titanium. Mixtures of CBN and diamond abrasive grains may range from 1 volume percent CBN and 99 volume percent diamond to 99 volume percent CBN and 1 volume percent diamond. Pressures, temperatures and sintering times are comparable with those used in the preparation of the second type of composite, except that the thermodynamic stability of diamond, that is present, requires slightly higher pressures and/or lower temperatures than in the second type of composite.

EXAMPLE III

A unit comparable to one sub-assembly in FIG. 2 was prepared in a Zr container (0.250 inch diameter). The charge therefor consisted of a disc of 883 grade Carboloy sintered carbide (0.121 inch thick) and, in contact therewith, a mixture of 0.046 g CBN grains (100–120 mesh), 0.046 g diamond grains (100–120 mesh) and 0.020 g of grade 883 Carboloy powder. The unit was simultaneously subjected to 55 kb of pressure and a temperature of 1,500°C for 60 minutes. The composite produced was polished into a cutting tool and tested by cutting Rene 41 superalloy on a lathe. The tool cut the superalloy, but the diamond portion of the abrasive compact wore away too quickly. Microscopic examination established that good diamond/diamond bonding had been accomplished during manufacture and there was good bonding by the diamond and CBN grains to the carbide support. Occasional CBN/CBN bonding but no diamond/CBN bonding was observed.

Referring now to the composite tool inserts shown in FIGS. 3, 5, and 6, in the preparation of any of these non-cylindrical shapes, a modified construction of salt liner 21 and plugs 22, 22' is required. Thus, the structure fitting within heater tube 20 may be formed as a series of cylindrical blocks in stacked cooperating arrangement to provide molds to be filled with the constituents, e.g., mixture of carbide molding powder and CBN grains. By way of example, in FIG. 7 salt block 21a has formed therein a recess 72 replicating the shape of the desired tool insert allowing for the thickness of the protective metal sheath 73. Recess 72 is lined with protective metal 73 (e.g., zirconium) as shown to contain the materials to be made into a composite. Cover salt block 21b has recesses therein to accommodate cover sheet 74 completing the protective metal enclosure and, preferably, a back-up block of sintered carbide SC to minimize puncturing of the protective metal layer 74. A number of cooperating pairs of salt blocks such as 21a, 21b may be employed to fill volume 31.

In the tool insert construction 40 of FIG. 3 both faces 41 and 42 of the cemented carbide/abrasive grain composite 43 are formed with a rake (FIG. 4) to facilitate presentation of the CBN cutting edges thereof to the workpiece.

If desired, most of the tool body 40 may consist of sintered carbide (either preformed or prepared in situ) with only the region forming and adjacent point 44 being of the cemented carbide/abrasive grain composite.

In forming the thin layers 51, 61 of consolidated CBN (about 99 volume percent) in the tool insert constructions 52, 62 shown in FIGS. 5 and 6, the layer of CBN grains is limited to a maximum thickness of about 0.040 inch (1.0 mm) and a minimum thickness of about 0.004 inch (0.1 mm) although the capability exists for preparing such layers in thicknesses as great as about 0.080 inch. The purpose of deliberately making these layers 51, 61 very thin is in order a). to present the CBN layers 51, 61 as chip breaker faces, b). to make it easier to sharpen the tool inserts 52, 62 and c). to economize on CBN grit used. Ideally, the relationship between the properties of the CBN layer to the cemented carbide will be such that the edge of the CBN layer will wear away slightly less rapidly than the cemented carbide. When this condition prevails, a small amount of the CBN layer will continue to project beyond the face of the cemented carbide body to provide a cutting edge and the amount of CBN utilized will be commensurate with the life of the tool.

After completion of the high temperature, high pressure process, first the temperature and then the pressure are reduced. Upon recovery of the tool insert masses, the protective sheath metal remains strongly affixed to the outer surfaces thereof. Exposure of the desired surfaces of the composite tool insert is accomplished by simply grinding away the protective sheath.

It has also been determined that the system is compatible with small amounts of additive materials, such as tungsten and berylium.

EXAMPLE IV

Two sub-assemblies were introduced into (at top and bottom) volume 31 of a high pressure, high temperature apparatus. Each sub-assembly was enclosed in a Zr cup (0.250 inch diameter) and consisted of a plug of 883 grade Carboloy sintered carbide (0.050 inch thick) and a mass of 100/120 mesh CBN grains (0.065 g). The CBN grains in the lower sub-assembly only were coated with a thin layer of Ta metal sputtered thereover. The sub-assemblies were subjected to the simultaneous application of a pressure of 55 kb and a temperature of 1,510°C for 60 minutes. The sub-assemblies were recovered, polished and examined under the microscope.

The upper sub-assembly displayed extensive direct bonding between CBN grains resulting in a strong abrasive body. There was also excellent adhesion of CBN grains to the sintered carbide.

The lower sub-assembly (Ta-coated CBN) was observed to have many regions in which CBN grains were sintered together. Other CBN crystals were bonded to the Ta matrix. Good adhesion of the CBN/Ta system to the sintered carbide was evident.

EXAMPLE V

A unit was prepared similar to the sub-assemblies of Example IV. A Zr cup (0.002 inch wall thickness and 0.250 inch in diameter) enclosure was loaded with a body (0.5 g) of cold-pressed 883 grade Carboloy carbide powder and, in contact with the surface thereof, a mixture consisting of 400 mesh CBN grains (0.060 g), 883 grade Carboloy carbide powder (0.021 g) and Be powder (0.003 g). The unit was subjected to the simultaneous application of a pressure of 56 kb and a temperature of 1,520°C for 60 minutes. A composite disc was obtained having a sintered carbide base (0.070 inch thick) covered on one side with a layer of consolidated CBN (0.028 inch thick) and a uniform diameter of 0.232 inch. Strong bonding was observed between CBN grains and sintered carbide as well as direct CBN/CBN bonding.

It is to be understood that composites produced as products in the practice of this invention will, most usually, be bonded to a larger body, e.g., a tool shank or drill bit for presentation to the material to be cut.

What we claim as new and desire to secure by Letters Patent of the United States is:

1. In a tool insert wherein a unified mass of greater than 70 per cent by volume of cubic boron nitride crystals is bonded to a larger metallic mass for support thereof, the combination with said mass of cubic boron nitride crystals of:
   a. a single mass of metal bonded carbide directly bonded thereto, said mass of metal bonded carbide being predominately of carbide material selected from the group consisting of tungsten carbide, titanium carbide, tantalum carbide and mixtures thereof with the metal bonding material therein being selected from the group consisting of cobalt, nickel, iron and mixtures thereof and
   b. the interface between said mass of cubic boron nitride crystals and said metal bonded carbide being free of voids and being irregular and interlocking on the scale of about 1–100 micrometers, said interlocking occurring between individual cubic boron nitride crystals and portions of the metal bonded carbide mass.

2. The combination of claim 1 wherein the cubic boron nitride content of the mass of cubic boron nitride crystals is at least about 99 percent by volume.

3. The combination of claim 1 wherein the mass of cubic boron nitride crystals is present as a layer having a thickness of about 0.060 inch or less.

4. A composite abrasive body comprising a mixture of metal bonded carbide and cubic boron nitride crystals, the metal bonded carbide being present in less than about 30 volume percent.

5. The abrasive body of claim 4 wherein the mixture contains diamond grains.

6. The process for preparing a composite abrasive body comprising the steps of:
   a. placing within an enclosure of protective metal a quantity of carbide powder containing metal bonding material therefor and a quantity of cubic boron nitride crystals, said quantity of carbide powder being predominately of carbide material selected from the group consisting of tungsten carbide, titanium carbide, tantalum carbide and mixtures thereof with the metal bonding material therein being selected from the group consisting of cobalt, nickel, iron and mixtures thereof,
   b. simultaneously heating said enclosure and the contents thereof to temperatures in the range of 1,300°–1,600°C and applying pressures thereto in excess of about 40 kilobars for at least 3 minutes,
   c. ceasing the input of heat to said enclosure,
   d. removing the pressure applied to said enclosure and
   e. recovering the composite abrasive body produced.

7. The process of claim 6 wherein the carbide powder and cubic boron nitride crystals are two contiguous discrete masses.

8. The process of claim 7 wherein the cubic boron nitride crystals are disposed in a layer over at least one flat surface of the mass of carbide powder, said layer being about 0.060 inch or less in thickness.

9. The process of claim 6 wherein the carbide powder and cubic boron nitride crystals are mixed together, the carbide powder being present in less than about 30 volume percent.

10. The process of claim 6 wherein the carbide powder contains tungsten carbide powder and cobalt powder.

11. The process for preparing a composite abrasive body comprising the steps of:
   a. placing within an enclosure of protective metal a metal bonded carbide body and contiguous therewith a smaller mass of cubic boron nitride crystals, said metal bonded carbide body being predominately of carbide material selected from the group consisting of tungsten carbide, titanium carbide, tantalum carbide and mixtures thereof with the metal bonding material therein being selected from the group consisting of cobalt, nickel, iron and mixtures thereof, said mass of cubic boron nitride crystals containing greater than about 70 volume percent of cubic boron nitride crystals,
   b. simultaneously heating said enclosure and the contents thereof to temperatures in the range of 1,300°–1,600°C and applying pressures thereto in excess of about 40 kilobars for at least 3 minutes.

c. ceasing the input of heat to said enclosure, d. removing the pressure applied to said enclosure and e. recovering the composite abrasive body produced.

12. The process of claim 11 wherein the cubic boron nitride crystals are disposed in a layer over at least one surface of the metal bonded carbide body, said layer being about 0.060 inch or less in thickness.

13. The process of claim 11 wherein the metal bonded carbide body contains tungsten carbide and cobalt.

14. The combination of claim 1 wherein the individual cubic boron nitride crystals are larger than about 80 micrometers in largest dimension.

15. The process of claim 6 wherein diamond crystals are also placed with the protective metal enclosure; the carbide powder, cubic boron nitride crystals and diamond crystals being mixed together, the carbide powder being present in less than about 30 volume percent.

* * * * *